Aug. 20, 1929.  M. SEREN  1,725,545
INTERNAL COMBUSTION ENGINE
Filed June 16, 1923  4 Sheets-Sheet 4
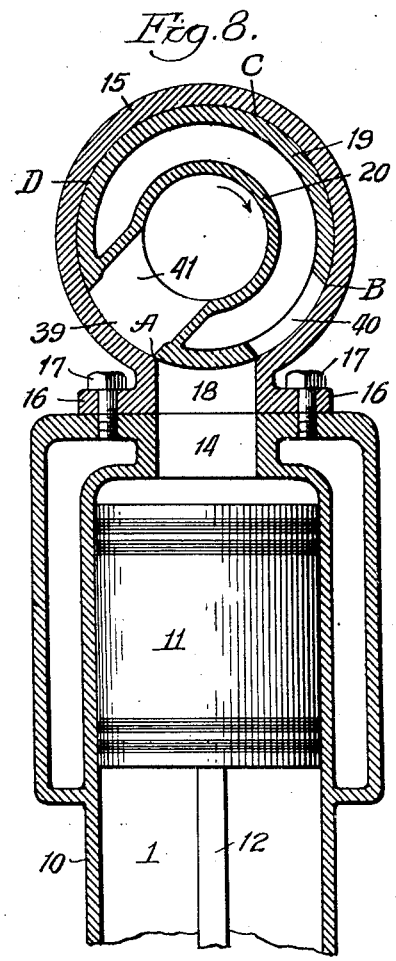
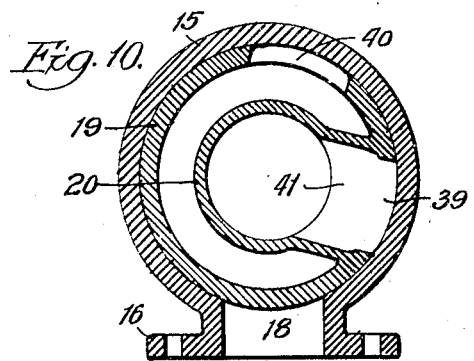
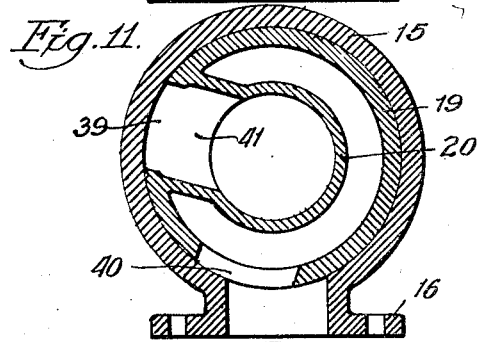
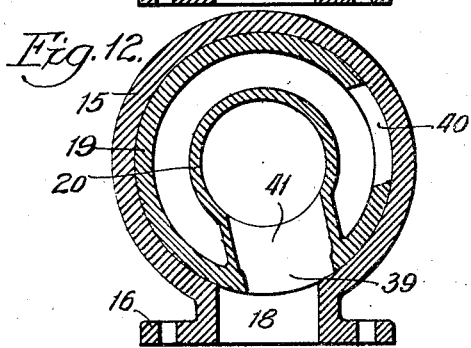
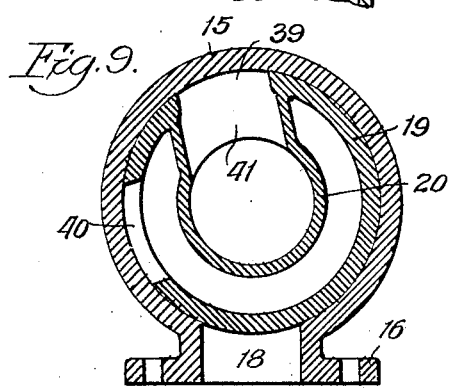
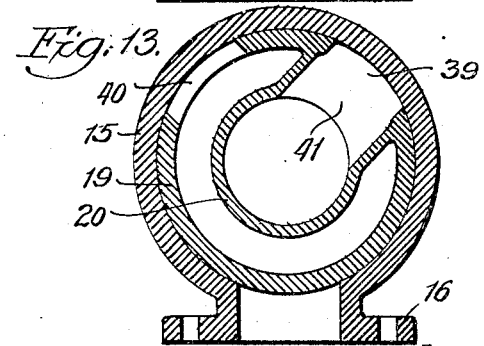
Inventor:
Morris Seren,
by Clarence J. Loftus,
Atty.

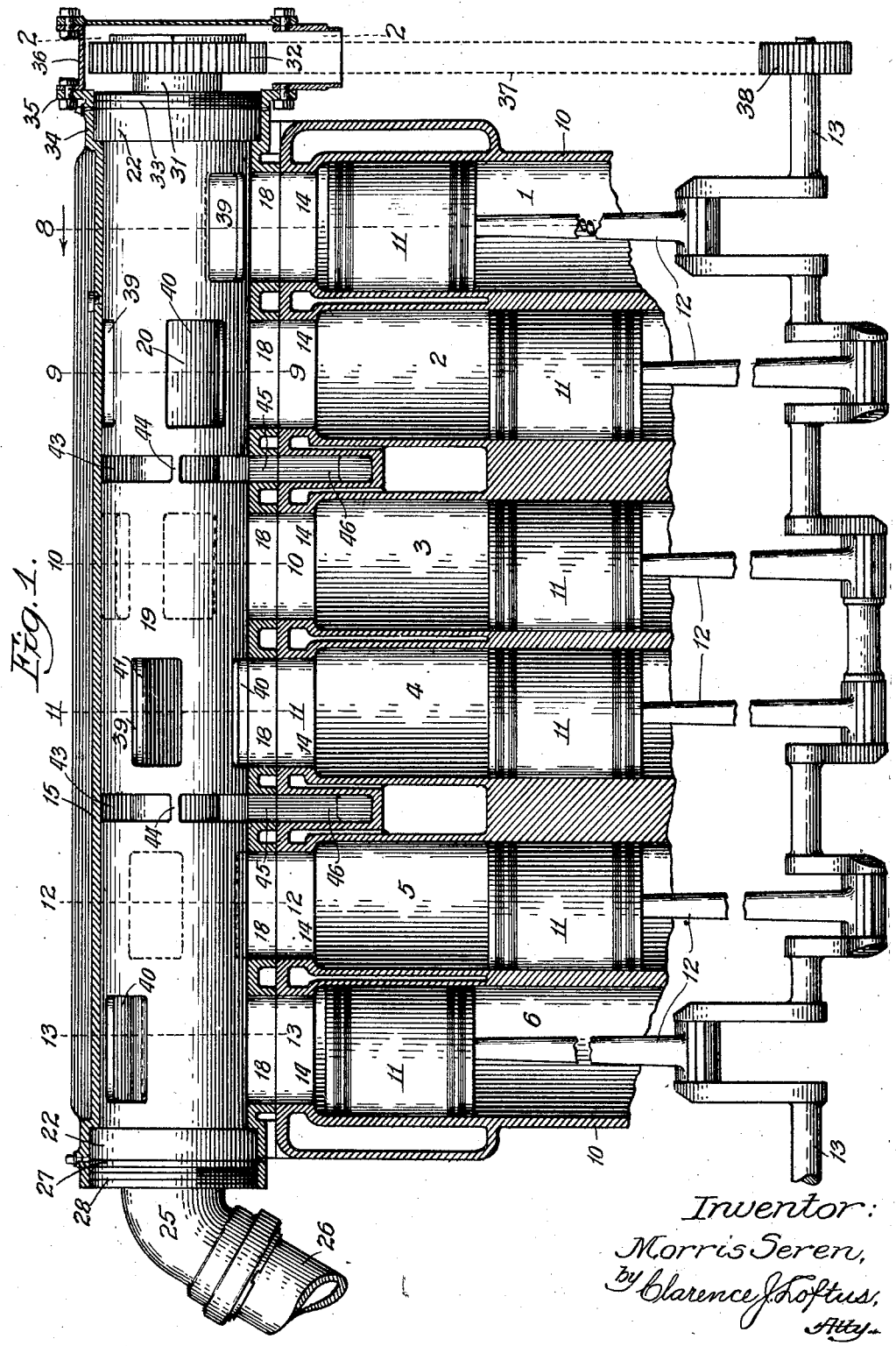

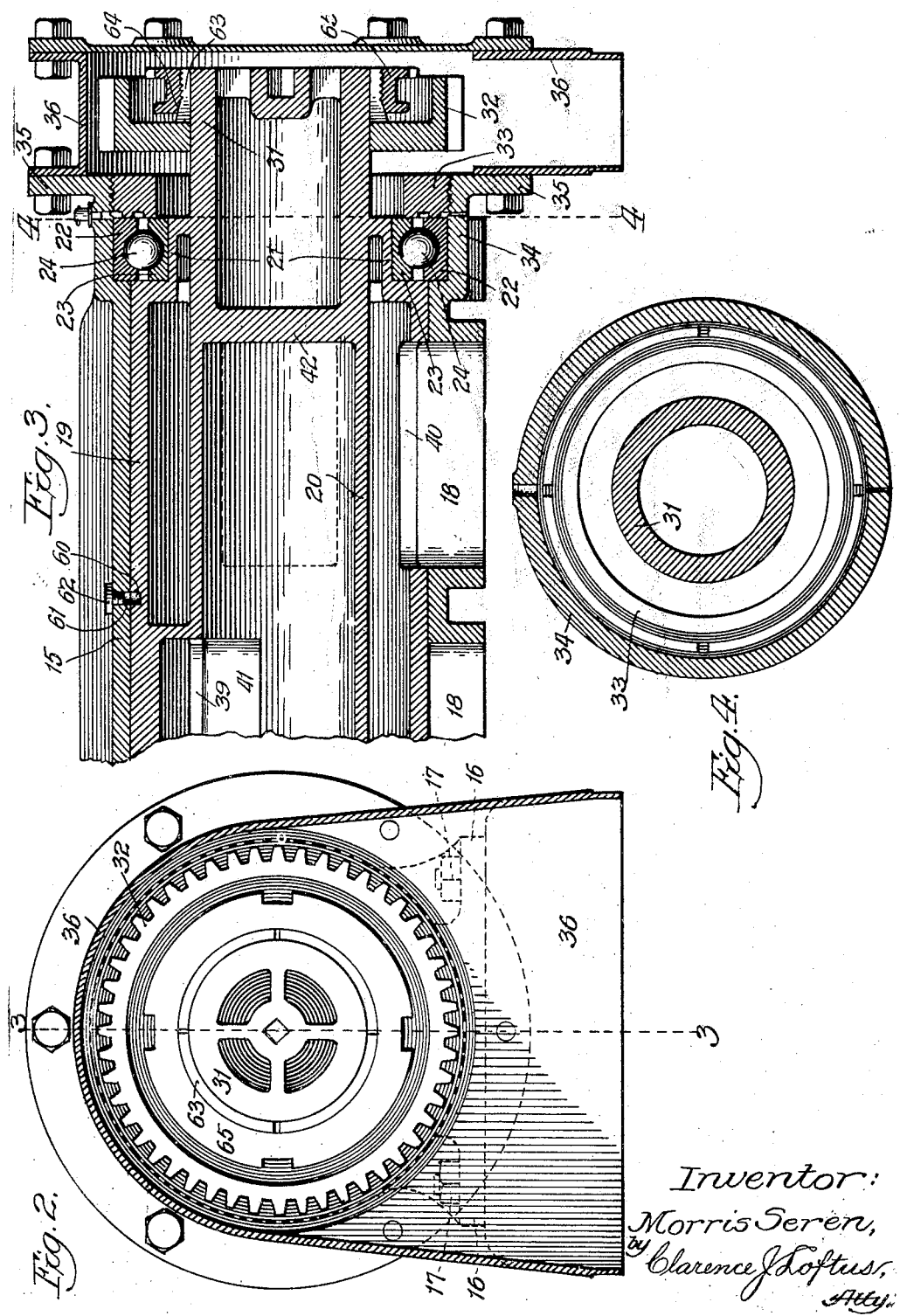

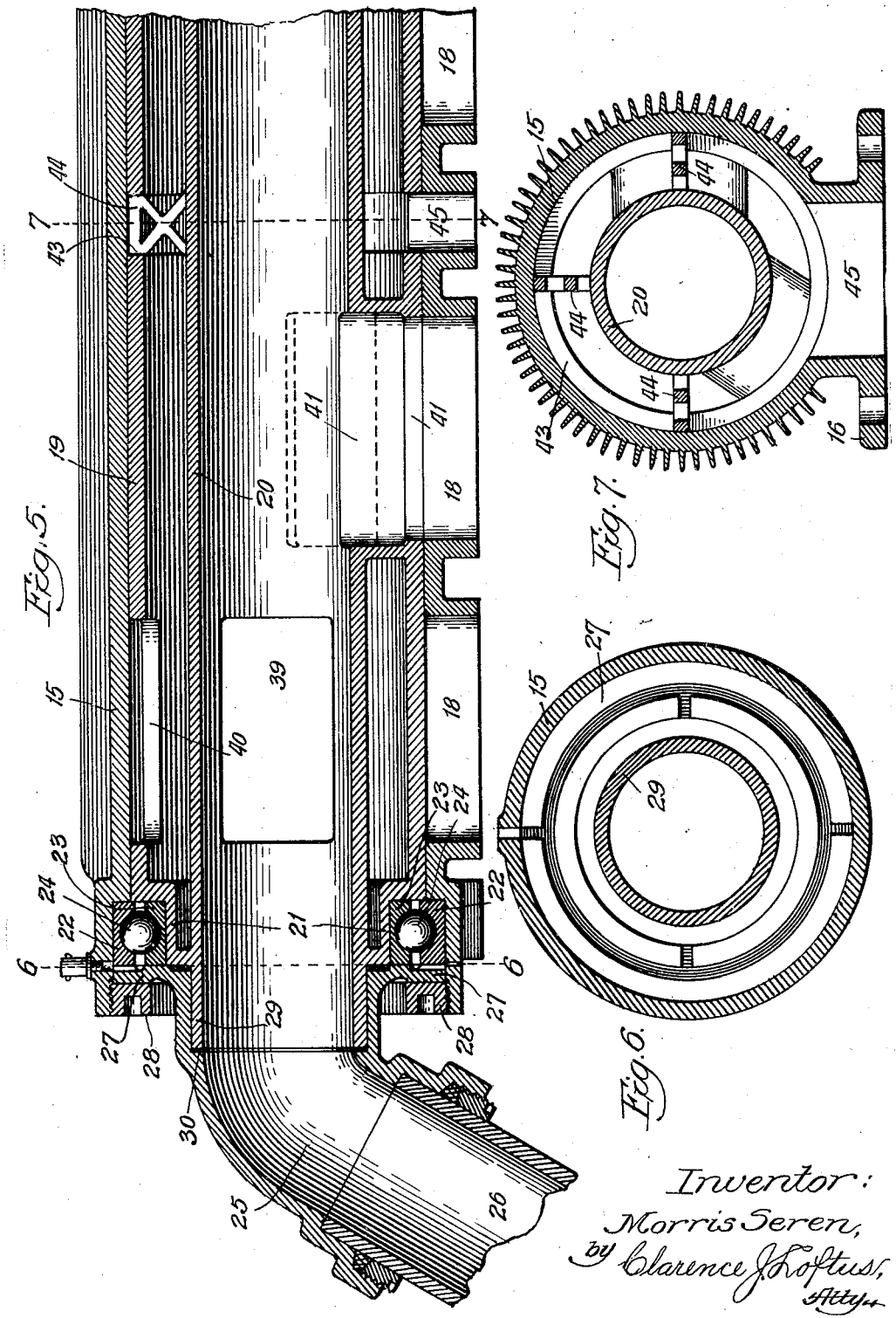

Patented Aug. 20, 1929.

1,725,545

UNITED STATES PATENT OFFICE.

MORRIS SEREN, OF MELROSE PARK, ILLINOIS.

INTERNAL-COMBUSTION ENGINE.

Application filed June 16, 1923. Serial No. 645,760.

It is an object of my invention to materially simplify the construction and increase the efficiency of motors of this type.

It is a further object to provide a noiseless motor of this type so designed as to eliminate sticky valves, valve grinding and valve adjustment.

It is a further object to provide means in a motor of this type which greatly improves the exhaust and intake.

It is a further object to provide a valve whereby the vaporized gas is preheated before entering the combustion chamber.

It is a further object to provide a new and improved valve in a motor of this type of simple, durable and efficient construction and which eliminates many of the inherent disadvantages of the motors now in use.

The above and other features of novelty, advantages and capabilities, will become apparent from a detailed description of the accompanying drawings, in which I have illustrated one form of my invention, but the construction there shown will be understood as illustrative only and not as defining the limits of my invention.

Fig. 1 is a vertical sectional view of a motor embodying my invention, showing portions of the cylinder casing broken away.

Fig. 2 is a view partly in section taken on the line 2—2 of Fig. 1.

Fig. 3 is a longitudinal vertical sectional view of a portion of the valve casing, rotary valve and driving means connected therewith.

Fig. 4 is a vertical sectional view taken on the line 4—4 of Fig. 3.

Fig. 5 is a longitudinal vertical sectional view of a portion of the valve casing and rotary valve showing the end opposite to that in Fig. 3 and connected with the exhaust.

Fig. 6 is a vertical sectional view taken substantially on the line 6—6 of Fig. 5.

Fig. 7 is a similar view taken on line 7—7 of Fig. 5.

Fig. 8 is a vertical sectional view taken substantially on the line 8—8 of Fig. 1 looking into the direction indicated by the arrows and Figs. 9, 10, 11, 12 and 13 are similar views taken respectively on the lines 9—9, 10—10, 11—11, 12—12, and 13—13 of Fig. 1.

In the embodiment shown, the structure there illustrated generally consists of a cylinder casing provided with six cylinders. In each cylinder is mounted a piston connected by means of a piston rod to the crank shaft. Securely mounted on the upper end of the cylinder casing is a hollow cylindrical valve casing. This casing is provided with six separate rectangular openings whose width is precisely one eighth of the circumference of the casing, registering with openings of the same size in the upper end of the cylinder casing and immediately above each cylinder. The cylinder casing is also provided with two small openings which register with vertical fuel conduits or wells in the cylinder casing, which wells are in turn connected by any satisfactory means not shown, to a suitable source of fuel supply such as a carbureter.

Within the valve casing is mounted a rotary valve. This valve comprises an outer shell or tube in engagement with the interior surface of the valve casing and a slightly smaller exhaust tube concentrically positioned within the larger tube or shell. These two tubes are formed integrally and the common ends thereof terminate in suitable stub shafts by means of which the entire valve is rotatably mounted on suitable ball bearings or the like, within the cylinder casing. The outer shell of the rotary valve is provided with a pair of rectangular intakes and exhaust openings for each cylinder, the width of such openings being exactly one eighth of the circumference of the outer shell of the rotary valve. The openings of each pair are spaced apart circumferentially and each are adapted to successively register, as the valve is rotated, with the openings in the valve casing leading to their respective cylinders. Each pair of intake and exhaust openings are spaced apart and staggered longitudinally of the rotary valve.

The exhaust opening of each pair is connected by an integral flue to the exhaust tube of the valve through which the exhaust is shot to the exhaust tube, one end of which tube is closed so that the spent gases are forced out through the discharge end of this tube. In order that the fuel may be admitted to the space between the outer shell and exhaust tube of the valve and from there to the different cylinders, the outer shell of the valve is provided with two narrow circumferential slots which are continuous except for reinforcing cross braces. These slots continuously register with the small openings in the bottom of the valve casing leading to the small fuel wells or conduits in the cylinder casings. The rotary valve is provided at one end with a spindle affixed to which is a gear wheel which gear wheel is operatively connected to another gear wheel one half its size, mounted on the crank shaft so that every time the crank shaft revolves twice, the rotary valve makes one complete revolution. The valve is adjusted or set at the factory so that the intake and exhaust openings register with the openings leading to the cylinder at the proper time, that is to say, when the cylinder is moving through the suction operation the intake opening of the valve is in registration with the opening leading to the cylinder. Then during the compressions and firing operation the opening leading to the cylinder is closed by the solid portion of the valve and then when the cylinder is traveling through the exhaust operation the exhaust opening of the valve leading to the exhaust tube is in registration with the opening leading to the cylinder. It will be noted that in the operation a substantial volume of fuel is at all times retained in the space between the outer shell of the casing and the exhaust tube and thus well preheated before reaching the combustion chambers of the cylinder.

The description thus far, while brief, generally describes the motor illustrated.

Referring to the drawings in detail, the invention here illustrated, as before stated, is shown applied to a six cylinder motor. The cylinder casing 10 which may be of any suitable construction, is provided with six vertical cylinders designated 1, 2, 3, 4, 5, 6. In each there is a piston 11 connected by piston rod 12 to a crank shaft 13. The order of operation or firing of these cylinders as shown is 1—5, 3—6 and 2—4.

The upper end or side of the cylinder casing is provided directly over each cylinder, with an opening 14. A cylinder valve casing 15 extending continuously throughout the length of the motor, provided with supporting legs or flanges 16, is tightly and securely mounted on the upper side of the cylinder casing by any suitable means, such as the bolts 17 shown. The valve casing 15 is provided with six rectangular openings 18 in registration with the openings 14 and of the same size.

Within the valve casing is mounted a rotary valve which valve comprises in effect an outer shell or tube 19 extending substantially throughout the length of the valve casing and of sufficient diameter to engage the interior surface of the valve casing and a comparatively smaller exhaust tube 20 concentrically arranged within the shell 19. The exhaust tube 20 and the shell 19 are formed integrally. The rotary valve is provided near each end with a reduced stepped portion which forms a stub shaft 21 by means of which the valve is rotatably mounted in the valve casing through the medium of the races 22 and 23 and the ball bearings 24. At the exhaust end of the valve is an elbow 25 leading to a suitable discharge pipe 26 and at its opposite end provided with a peripheral flange 27 adapted to fit tightly within the valve casing 15 and bearing against the stub shaft 21, and the races 22 and 23 for holding them in proper position and alignment. This elbow, in turn, is held in place within the valve casing by means of an externally screw-threaded retaining ring 28 as best shown in Fig. 5. The exhaust tube is provided with an extension 29 adapted to extend into the elbow 25 and against the shoulder 30 thereof, in order to afford a substantial close fit to prevent the exhaust from escaping, except through its intended channel. The opposite or driving end of the valve is provided with a substantial spindle 31, on which it is non-rotatably mounted by means presently to be described, the gear wheel 32. The valve is held against longitudinal movement and the mounting thereof held in proper position and alignment by the exteriorly screw-threaded ring 33 which is screw-threaded into the integral extension 34 of the casing 15. The extension 34 is provided with a peripheral flange 35 to which flange is secured a suitable housing 36 to protect the gear 32 and adjacent parts.

The gear 32 is driven through a suitable sprocket chain 37 by the gear 38 mounted on the crank shaft 13. The gear 38 is one-half the diameter of the gear 32 so that the rotary valve makes one complete revolution to every two of the crank shaft.

The shell 19 of the valve is provided with six exhaust openings 39 and six intake openings 40. These openings are rectangular in form, the width thereof being precisely one eighth of the circumference of the shell 19, and of the same size and configuration as the openings 18 in the valve casing. The openings 39 and 40 are spaced apart longitudinally and staggered around the shell 19 and arranged in pairs so that there is one exhaust opening and one intake opening, for each cylinder, spaced apart circumferentially, and so positioned as to register successively with the opening leading to their respective cylinder as the valve is rotated. The width of each opening is one-eighth the circumference of the shell 19 of the valve and of the same length as the opening in the cylinder. The shortest circumferential space between each pair of openings is equal to one-eighth while the greatest circumferential space is equal to five-eighths of the circumference of the shell 19, for a purpose as will presently appear. The exhaust opening 39 of each pair is by means of an integral flue 41 connected to the exhaust pipe 20 through which the spent gases are expelled. In order to cause such gases to pass through the discharge end of the exhaust pipe one end of this pipe is closed by the member 42.

The shell 19 is provided with two peripheral slots 43 substantially continuous, save for a plurality of integral narrow cross members or braces 44. These slots are substantially in constant registration with the comparatively small openings 45 in the bottom of the valve casing 15. The openings 45 are in fixed registration with the fuel wells or conduits 46 formed in and extending downwardly into the cylinder casing (as best shown in Fig. 1). These wells 46 are, by suitable means, as indicated by Fig. 1, connected to a suitable supply of fuel, such as any well known carbureter, not shown. It will thus be seen that in operation the fuel is drawn from the carbureter or other source of supply into and up through the wells, through the opening in the valve casing, thence through the peripheral slots into the valve and as the fuel passes through the valve to the different cylinders it is sufficiently preheated by the exhaust pipe within the valve.

In operation, assuming the parts are assembled and in the positions shown, the motor is first started in the usual way, whereupon the small gear on the crank shaft through the chain drives the gear 32 and rotates the valve. In other words, the arrangement is such that the moment the crank shaft moves the rotary valve starts operation. It will, of course, be understood, that each of the cylinders has the usual four cycles or operations, namely, suction, compression, firing, and exhaust.

Cylinder 1 we will assume is in the position shown in Fig. 1 and 8 where it has just finished its exhaust cycle or operation, and is now commencing on its suction cycle or operation, the rotary valve is so timed that the arc AB passes the opening 18 and the intake opening 40 is brought into and out of registration with the opening 18 during the suction operation. While it is in registration fuel is sucked into the combustion chamber of the cylinder. Just before the piston starts upwardly again through its compression cycle or operation the opening 18 is closed so that as the cylinder travels upwardly the fuel is put under compression. During the compression cycle or operation the arc BC passes the opening 18 so that it is closed during the entire compression cycle. Upon completion of the compression cycle or operation the firing takes place. While this operation is again on the arc CD travels past the opening 18, still keeping it closed. The next movement of the piston is the exhaust cycle or operation, during which movement the arc DA travels past the opening 18 and the exhaust opening 39 is brought into registration with the opening 18, to permit the spent gases to be expelled through the flue 41, into the exhaust pipe 20, and out its discharge end.

The operation of the other cylinders are the same, but differ as to the timing. For example, the order is 1—5, 3—6 and 2—4, so that when the piston of cylinder 1 is in the position shown in Figs. 1 and 8 and the valve intake opening is just coming into registration with such cylinder, cylinder 5 at that moment is on its exhaust cycle or operation and the openings in the valve for that cylinder are in the position shown in Fig. 12. At the same time cylinder 3 is going through or about completing its firing cycle or operation. Cylinder 6 is about to fire; cylinder 2 is going through the compression cycle and cylinder 4 through the suction cycle. When the piston in cylinder 1 is in the position shown in Figs. 1 and 8 and it is going through the operation heretofore described, the other pistons are in the positions shown in Fig. 1 and the respective intake and discharge openings for these cylinders in the rotary valve, that is, for cylinders 2, 3, 4, 5, and 6, are shown respectively in Figs. 9, 10, 11, 12 and 13.

To make the operation more clear, each operation of each cylinder, namely, suction, compression, firing and exhaust, takes place during a one-fourth revolution of the rotary valve.

Should the rotary valve, for some unforeseen reason, become out of time or step, all that is necessary is to rotate the valve until the small notch 60 in the top thereof (Fig. 3) registers with the opening 61 in the valve casing. In order to determine when they have been brought into registration, all that is necessary is to remove the cap 62 and insert a pin or bolt loosely in the opening 61, which will drop in the notch 60 when brought into proper registration thereupon the driving sprocket wheel 32 is released on the spindle 31 so as to permit it to easily rotate on such spindle and by rotating the sprocket wheel 32 after being so released the crank shaft is brought into registration or proper position through the sprocket chain 37. In order to yieldingly and adjustably mount the gear wheel 32 on the spindle 31, I have provided such gear with a split hub portion 63 having a beveled shoulder 64 all formed integrally with the gear 32. This hub portion is screw-threaded and adapted to receive the screw-threaded ring 65 which ring is provided with a beveled shoulder on its inner edge and as the ring is secured on to the hub, this shoulder contacts with the shoulder 64 on the hub, causing the split hub to contract and tightly but yieldingly grip the spindle 31.

Having thus described my invention, I claim:

1. In an internal combustion motor comprising cylinders and a crank shaft, a rotary valve device for controlling supply and exhaust of fuel to and from said cylinders and having a rotary member, means for readily and quickly setting said member with relation to the angular position of the crank when a given cylinder is at the starting point of compression, said means comprising a pin loosely mounted in a given part of the valve device and adapted to extend into a notch provided at a given point in said member when the member is brought with the notch in registry with said pin.

2. In an internal combustion engine comprising cylinders and a crank shaft, a rotary valve device for controlling supply and exhaust of fuel to and from said cylinders and having a rotary member, and means for readily and quickly setting said member with relation to the angular position of the crank when a given cylinder is at the starting point of compression, said means including a pin adapted to engage a notch in said member.

3. In an internal combustion engine comprising cylinders and a crank shaft, a rotary valve device for controlling supply and exhaust of fuel to and from said cylinders and having a rotary member, and means on said device for readily and quickly setting said member with relation to the angular position of the crank when a given cylinder is at the starting point of compression, said means including a pin and openings in said device, said pin being adapted to bring said openings into registry.

In witness whereof, I have hereunto subscribed my name to this specification.

MORRIS SEREN.